(12) United States Patent
He

(10) Patent No.: US 9,797,579 B2
(45) Date of Patent: Oct. 24, 2017

(54) POSITIONING DEVICE FOR OPTICAL MEMBRANE

(71) Applicant: SHENZHEN CHINA STAR OPTOELECTRONICS TECHNOLOGY CO., LTD., Shenzhen, Guangdong (CN)

(72) Inventor: Hu He, Guangdong (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/647,108

(22) PCT Filed: Jan. 21, 2015

(86) PCT No.: PCT/CN2015/071226
§ 371 (c)(1),
(2) Date: May 25, 2015

(87) PCT Pub. No.: WO2015/110013
PCT Pub. Date: Jul. 30, 2015

(65) Prior Publication Data
US 2016/0320029 A1 Nov. 3, 2016

(30) Foreign Application Priority Data

Jan. 22, 2014 (CN) .......................... 2014 1 0029875

(51) Int. Cl.
*G02F 1/1335* (2006.01)
*F21V 17/10* (2006.01)
(Continued)

(52) U.S. Cl.
CPC .......... *F21V 17/108* (2013.01); *F21V 17/002* (2013.01); *G02B 5/02* (2013.01); *G02F 1/133608* (2013.01)

(58) Field of Classification Search
CPC . G02B 5/08; F21V 17/00; F21V 17/04; F21V 17/06; F21V 17/10; F21V 17/104; F21V 17/107; F21V 17/14
(Continued)

(56) References Cited

U.S. PATENT DOCUMENTS 8,625,049 B2 * 1/2014 Kim .................. G02F 1/133608
349/58
2013/0343087 A1 * 12/2013 Huang ................ G02B 6/0011
362/613

FOREIGN PATENT DOCUMENTS

CN       1584696 A      2/2005
CN     102073165 A      5/2011
(Continued)

OTHER PUBLICATIONS

Jun Liu, the International Searching Authority written comments, dated Apr. 2015, CN.

*Primary Examiner* — Ricky Mack
*Assistant Examiner* — Robert E Tallman

(57) ABSTRACT

The present invention provides a positioning device for an optical membrane that includes at least one positioning hole formed on the optical membrane and at least one positioning pole interposed into the positioning hole respectively, the optical membrane is fixed onto a carrying substrate by traversing said positioning holes by said positioning poles, wherein the profile of each positioning hole extending in corresponding position in the expansion and shrink direction of the optical membrane. A certain width could be reserved in the positioning hole to allow the optical membrane expand and shrink freely at each fixing point and the (Continued)

positioning pole cannot interfere with the positioning hole at the moment of the optical membrane expands and shrinks to cause bending, thus to guarantee flatness of the optical membranes and improve the quality of the backlight module.

10 Claims, 1 Drawing Sheet

(51) Int. Cl.
  *G02B 5/02* (2006.01)
  *F21V 17/00* (2006.01)
(58) Field of Classification Search
  USPC .............................. 359/871, 237, 227, 321
  See application file for complete search history.

(56) References Cited

FOREIGN PATENT DOCUMENTS

| | | |
|---|---|---|
| CN | 102734713 A | 10/2012 |
| CN | 102748668 A | 10/2012 |
| CN | 202501393 U | 10/2012 |
| CN | 102901005 A | 1/2013 |
| CN | 202757022 U | 2/2013 |
| CN | 103292216 A | 9/2013 |
| JP | 2007258190 A | 10/2007 |

* cited by examiner

POSITIONING DEVICE FOR OPTICAL MEMBRANE

FIELD OF THE INVENTION

The present invention relates to optical components of a backlight module, and more particularly to a positioning device for an optical membrane.

BACKGROUND OF THE INVENTION

In general, the optical membranes are applied in the backlight modules to enhance the brightness of the backlight modules, wherein the membrane needs to be positioned by certain designed mechanism due to its small thickness. The existing optical membranes are provided with a plurality positioning holes that have figures matching with those of the positioning poles. However, an expansion and contraction effect might occur to the optical membranes in high temperature and humidity conditions, and an interference phenomenon of the optical membranes would appear between the positioning posts and the positioning holes in where they are positioned. As a result, the optical membranes could be deformed and curved, which greatly affect the installation and using of the optical membranes, thereto reduce imaging quality of the backlight modules by appearing shadow and other inferior phenomenon.

SUMMARY OF THE INVENTION

On account of the lack of the prior art, the object of the present invention is to provide a positioning device by which the optical membranes could expanse and shrink freely, wherein the interference phenomenon wouldn't occur at the level of interposing the positioning pole with the positioning hole, thus to guarantee flatness of the optical membranes.

The present invention provides a positioning device for an optical membrane, comprising at least one positioning hole formed on the optical membrane and at least one positioning pole interposed into the positioning hole respectively. The optical membrane can be fixed onto a carrying substrate by traversing the positioning holes by the positioning poles. Wherein the profile of each positioning hole extends in a corresponding position in the expansion and shrink direction of the optical membrane.

Preferably, said positioning hole comprise at least one fixing hole, at least one lateral positioning hole and at least one longitudinal positioning hole. The lateral positioning holes are aligned with the longitudinal positioning holes. The extending direction of each said lateral positioning hole is parallel to the corresponding positioning hole, and the longitudinal positioning holes aren't aligned with the fixing holes. The extending direction of each said lateral positioning hole is parallel to the corresponding fixing hole, and the extending direction of each said longitudinal positioning hole is perpendicular to the corresponding fixing hole. The interference phenomenon between each positioning pole and the corresponding positioning hole could be avoided by extending the positioning poles in the expanding and shrinking direction, thus to guarantee flatness of the optical membranes.

Preferably, said positioning hole further comprise at least one oblique positioning hole, extending directions of which point to the fixing hole.

Preferably, said lateral positioning holes, said longitudinal positioning holes and said oblique positioning holes are provided respectively around the fixing hole, direction of each long axis is in a same line with connecting line of each center and the fixing hole's center. Each long axis of said lateral positioning holes, said longitudinal positioning holes and said oblique positioning holes is longer than that of each short axis and diameter of said fixing pole.

Preferably, the profile of said fixing hole adapts to the form of the fixing pole, and the forms of said lateral positioning holes, said longitudinal positioning holes and said oblique positioning holes are oval or rounded rectangle.

Compared with the prior art, the positioning device of the optical membranes according to the present invention provides the positioning holes with different form around the fixing hole, wherein the extending direction of each positioning hole is the same with the expansion and shrink direction of the optical membrane. The long axis is longer in the extending direction than the diameter of the fixing pole. A certain width could be reserved in the positioning hole to allow the optical membrane expand and shrink freely at each fixing point and the positioning pole cannot interfere with the positioning hole at the moment of the optical membrane expands and shrinks to cause bending, thus to guarantee flatness of the optical membranes and improve the quality of the backlight module.

DETAILED DESCRIPTION OF THE PREFERRED EMBODIMENTS

Figure 1:
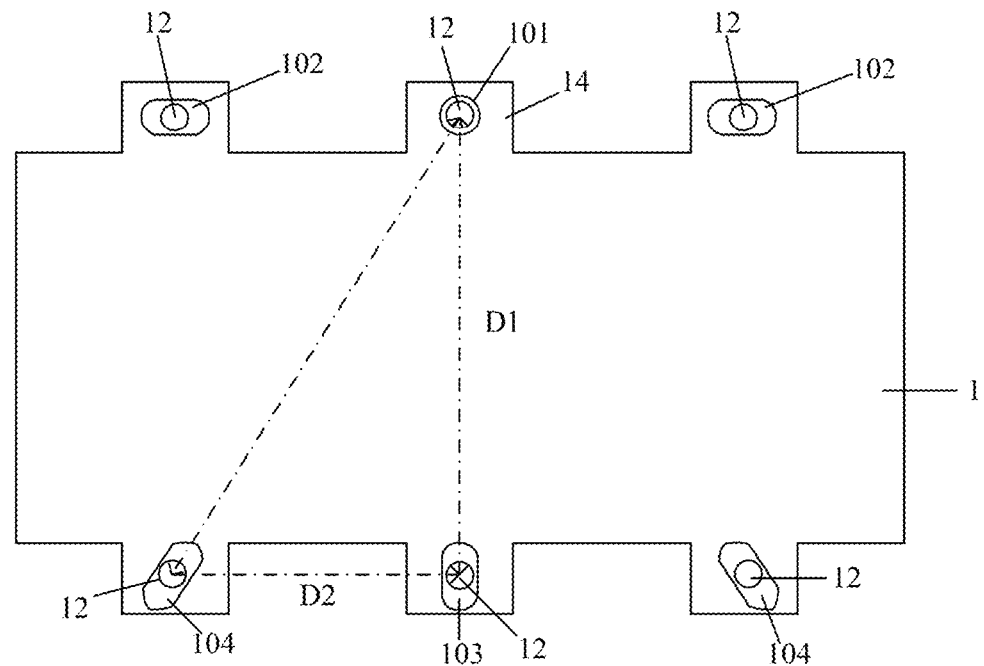
FIG. 1 is an assembling schematic diagram of a positioning device for optical membrane of the invention.

Please refer to FIG. 1, the present invention provides a positioning device for optical membrane to strengthen the position of optical membranes and avoid a positioning pole interfere with a positioning hole at the moment of the optical membrane expands and shrinks and so as to guarantee the flatness of the optical membranes. The present positioning device includes at least one positioning hole 10 provided on the optical membrane 1 and at least one positioning pole 12 inserted into the positioning holes 10 respectively. The optical membrane 1 is fixed onto a carrying substrate by traversing the positioning pole 12 in the positioning hole 10. The profile of each positioning holes 10 extends in the corresponding expansion and shrinking direction of the optical membrane 1.

The optical membrane 1 applies to backlight modules, such as diffusion sheets, prism sheets, adding films, etc. to enhance the brightness and the backlight modules and to make it more attractive. Position and number of the positioning hole 10 vary according to the different design and sizes of the optical membranes. Preferably, the positioning hole 10 are provided at each side, four corners and near to the center of the optical membrane to fix its sides onto the carrying substrate.

In a preferred embodiment of the present invention, the optical membrane 1 has a rectangular shape and three puncturing ears 14 extend respectively from a top arm and a bottom arm thereof. The puncturing ears 14 on the top arm are along a same line, likewise, the puncturing ears 14 on bottom arm are also along a same line, furthermore, the puncturing ears 14 on the top arm are aligned with those on bottom arm respectively, therefore make each point of the optical membrane 1 suffer balanced force. The positioning hole 10 includes at least one fixing hole 101, at least one positioning holes 102 and at least one longitudinal positioning hole 103. The fixing hole 101 matches with its corresponding positioning pole 12, for example, the fixing hole 101 has a circular cross section if the positioning pole has a circular cross section. The lateral positioning hole 102 is in the same line with the corresponding fixing hole 101, but the positioning hole 103 isn't in the same line with the fixing hole 101. Wherein the fixing hole 101 is provided on the puncturing ears 14 locating in the middle of the top arm of the optical membrane 1, and the positioning poles 12 traverse the corresponding fixing hole 101 to be fixed on the carrying substrate. The lateral positioning holes 102 are provided on a same horizontal line with the fixing holes 101 to fix the top arm of the optical membrane 1, by this method, the optical membrane 1 can be fixed by multiple points to be more firmly fitted on the carrying substrate. Preferably, there are two lateral positioning holes 102, which are symmetrically disposed on both sides of the fixing hole 101. The lateral positioning hole 102 has an oval or rounded rectangle shape, the direction of its short axis is identical with that of the diameter of the positioning pole 12, and the direction of its long axis is on the same line of the connecting line between its center and the center of the fixing hole 101. The lateral positioning hole 102 extend in the direction of its long axis, moreover, the extending direction is parallel to the corresponding fixing hole 101. The width of the lateral positioning hole 102 is enlarged by extending, which could avoid an interference phenomenon between the positioning post 12 and the positioning hole 102 when an lateral expansion effect occurs to the optical membrane 1 in high temperature and humidity conditions, as a result, the optical membranes 1 could extend to the right and the left freely. The same way, during contraction of the optical membrane 1, a proper width would be reserved in the lateral positioning hole 102, so as to avoid the interference phenomenon between the optical membrane 1 and the positioning post 12 which might bent and deform the optical membrane 1. In order to position the optical membrane 1 in the longitudinal direction, the longitudinal positioning hole 103 is provided on the puncturing ear 14 of the bottom arm of the optical membrane 1, and the longitudinal positioning hole 103 is directly below the fixing hole 101 to position in the longitudinal direction the optical membrane 1. Similarly, the longitudinal positioning hole 103 has also an oval or rounded rectangle shape, the direction of its short axis is identical with that of the diameter of the positioning pole 12, and the direction of its long axis is on the same line of the connecting line between its center and the center of the fixing hole 101. The extending direction of the long axis of the longitudinal positioning hole 103 is perpendicular to that of the lateral positioning hole 102, and the width of the longitudinal positioning hole 103 is enlarged by extending, which could avoid an interference phenomenon between the positioning posts 12 and the longitudinal positioning hole 103 when an longitudinal expansion effect occurs to the optical membrane 1 in high temperature and humidity conditions, as a result, the optical membranes 1 could extend up and down freely in the longitudinal direction. Furthermore, during contraction of the optical membrane 1, a proper width would be reserved in the longitudinal positioning hole 103, so as to avoid the interference phenomenon between the optical membrane 1 and the positioning posts 12 which might bent and deform the optical membrane 1.

Figure 2:
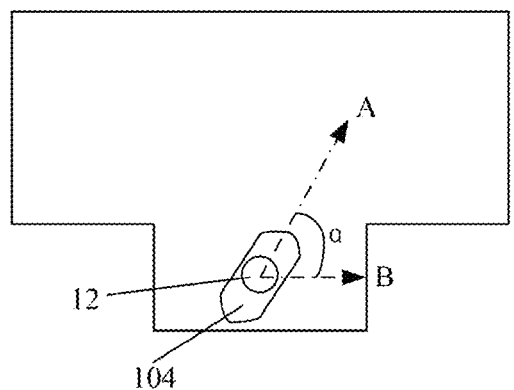
FIG. 2 is an enlarged view of a positioning device for optical membrane of the invention at the position of an oblique positioning hole.

With reference to FIG. 2, in a further preferred embodiment of the present invention, at least one oblique positioning hole 104 is provided symmetrically on the puncturing ears 14 of the bottom of the optical membrane 1 and is distributed on both sides of the longitudinal positioning hole 103 to fix the two sides of the optical membrane 1, therefore strength the position of sides the optical membrane 1. The extending direction of the oblique positioning hole 104 points to the fixing hole 101. As shown in FIG. 2, the long axis of the oblique positioning hole 104 is on the same line with the connecting line between its center and the center of the fixing hole 101. the angle of the long axis (direction A) of the oblique positioning hole 104 and the long said (direction B) of the optical membrane is expressed as $\alpha$, a vertical component of the connecting line between the centers of the oblique positioning hole 104 and the fixing hole 101 is expressed as D1, and its horizontal component is expressed as D2, then tan $\alpha$=D1/D2. The extending direction of the long axis of the oblique positioning hole 104 is identical with the direction of the resultant force of this point, thus to avoid the interference phenomenon between the optical membrane 1 and the positioning posts 12 with the optical membrane 1 expands or contracts, so the two sides of the bottom arm of the optical membrane 1 could expand or contract freely and bending and deformation of the optical membrane could be avoid. The widths of the long axis of the lateral positioning hole, the longitudinal positioning hole and the oblique positioning hole are longer than that of their short axis and the diameter of the positioning pole.

Number and positions of the fixing hole and the positioning hole of the present invention are not limited, and the lateral positioning hole 102, the longitudinal positioning hole 103 and the oblique positioning hole 104 are provided around the fixing hole 101 respectively to strengthen the positioning surrounding the fixing hole. Meanwhile, the extending direction of the long axis of each positioning hole is identical with the direction of the expansion and contraction point of the optical membrane locating on each corresponding hole, and the widths of the long axis of each hole is longer than the diameter of the positioning hole 102, so as to reserve a certain width in the positioning hole to make the optical membrane expand and contract freely and avoid the positioning pole interfere with the positioning hole at the moment of the optical membrane expands and shrinks which might cause bending, thus to guarantee the quality of the backlight module.

What is claimed is:

1. A positioning device for an optical membrane, comprising at least one positioning hole formed on the optical membrane and at least one positioning pole interposed into the positioning hole respectively, said optical membrane being fixed onto a carrying substrate by traversing said positioning holes by said positioning poles, wherein the profile of each positioning hole extending in corresponding position in the expansion and shrink direction of said optical membrane, said positioning holes comprising at least one fixing hole, at least one lateral positioning hole and at least one longitudinal positioning hole, said lateral positioning holes and said longitudinal positioning holes are arranged at a same horizontal line and said longitudinal positioning holes and said fixing holes are arranged at a same longitudinal line, wherein an extending direction of each said longitudinal positioning hole is perpendicular to a horizontal direction, wherein said positioning hole further comprises at least one oblique positioning hole, the at least one oblique positioning hole extending toward to the fixing hole.

2. The positioning device for an optical membrane according to claim 1, wherein said lateral positioning holes, said longitudinal positioning holes and said oblique positioning holes are provided respectively around the fixing hole.

3. The positioning device for an optical membrane according to claim 1, wherein the profile of said fixing hole adapts to the form of the fixing pole.

4. The positioning device for an optical membrane according to claim 3, wherein the forms of said lateral positioning holes, said longitudinal positioning holes and said oblique positioning holes are oval or rounded rectangle.

5. The positioning device for an optical membrane according to claim 4, wherein each long axis of said lateral positioning holes, said longitudinal positioning holes and said oblique positioning holes is longer than that of each short axis and diameter of said fixing pole.

6. A positioning device for an optical membrane, comprising at least one positioning hole formed on the optical membrane and at least one positioning pole interposed into the positioning hole respectively, said optical membrane being fixed onto a carrying substrate by traversing said positioning holes by said positioning poles, wherein the profile of each positioning hole extending in corresponding position in the expansion and shrink direction of said optical membrane, said positioning holes comprising at least one fixing hole, at least one lateral positioning hole and at least one longitudinal positioning hole, said lateral positioning holes and said longitudinal positioning holes are arranged at a same horizontal line-and said longitudinal positioning holes and said fixing holes are arranged at a same longitudinal line, wherein an extending direction of each said longitudinal positioning hole is perpendicular to a horizontal direction, wherein said positioning hole further comprises at least one oblique positioning hole, the at least one oblique positioning hole extending toward to the fixing hole.

7. The positioning device for an optical membrane according to claim 6, wherein said lateral positioning holes, said longitudinal positioning holes and said oblique positioning holes are provided respectively around the fixing hole.

8. The positioning device for an optical membrane according to claim 6, wherein the profile of said fixing hole adapts to the form of the fixing pole.

9. The positioning device for an optical membrane according to claim 6, wherein the forms of said lateral positioning holes, said longitudinal positioning holes and said oblique positioning holes are oval or rounded rectangle.

10. The positioning device for an optical membrane according to claim 6, wherein each long axis of said lateral positioning holes, said longitudinal positioning holes and said oblique positioning holes is longer than that of each short axis and diameter of said fixing pole.

* * * * *